United States Patent
Pan et al.

(10) Patent No.: US 6,458,881 B1
(45) Date of Patent: Oct. 1, 2002

(54) SOFT POLYMERIC COMPOUNDS INCLUDING HYDROPHOBIC FILLERS

(75) Inventors: Xiao-Dong Pan; Xiaorong Wang, both of Akron, OH (US)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 09/717,957

(22) Filed: Nov. 20, 2000

(51) Int. Cl.$^7$ .................................................. C08K 5/01
(52) U.S. Cl. ...................................................... 524/490
(58) Field of Search ................................ 524/492, 490

(56) References Cited

U.S. PATENT DOCUMENTS

| | | | |
|---|---|---|---|
| 4,704,414 A | 11/1987 | Kerner et al. | |
| 5,540,767 A | * 7/1996 | Ronlan .................. | 106/287.35 |
| 5,780,531 A | 7/1998 | Scholl | |
| 5,905,116 A | 5/1999 | Wang et al. | |
| 5,910,530 A | 6/1999 | Wang et al. | |
| 5,912,296 A | 6/1999 | Wang et al. | |
| 5,994,468 A | 11/1999 | Wang et al. | |
| 6,025,415 A | 2/2000 | Scholl | |
| 6,048,930 A | 4/2000 | Wang et al. | |
| 6,054,532 A | 4/2000 | Wang et al. | |
| 6,107,409 A | 8/2000 | Hogan et al. | |
| 6,133,354 A | 10/2000 | Wang et al. | |
| 6,184,292 B1 | 2/2001 | Hall et al. | |
| 6,191,197 B1 | 2/2001 | Wang et al. | |
| 6,191,217 B1 | 2/2001 | Wang et al. | |

OTHER PUBLICATIONS

L.A. Belyakova, A. M. Varvarin, Surfaces Properties of Silica Gels Modified with Hydrophobic Groups, Colloids and Surfaces A: Physiochem. Eng. Aspects 154 (1999) pp. 285–294.
B.B.Boonstra et al., Reinforcement of Silicone Rubber by Particulate Silica, Kautschuk+ Gummi, Kunstrstoffe 29, Jahrgang, Nr. Jan. 1976.
Degussa brochure.
Degussa Corporation Product Information, Revision No. 2, Issue Date Aug. 18, 1998 (MH), Expiration Date: Dec. 31, 1998.
H. Ferch et al., Synthetic Amorphous Silicas in Fine Powder Form, KGK Kautschuk Gummi Kunststoffe 49, Jahrgang, Nr. Sep. 1996.
J. Chmielowiec and B. A. Morrow, Alkylation of Silica Surfaces, Journal of Colloid and Interface Science, vol. 94, No. 2, Aug. 1983.
Ciullo and Hewitt, The Rubber Formulary, pp. 26–43.

* cited by examiner

Primary Examiner—Paul R. Michl
(74) Attorney, Agent, or Firm—Scott McCollister; Meredith E. Palmer

(57) ABSTRACT

A polymer gel composition having a Shore A hardness less than 20. The polymer gel composition includes a polymer having at least 2 blocks derived from a vinyl-substituted aromated hydrocarbon, a $R_1R_2$ethylene, an alkyl vinyl ether, a maleimide, and a conjugated diene. At least one hydrophobic filler is included and, optionally, an extender. If maleimide is chosen, a maleated polyalkylene and a grafting agent are also included in the polymer composition.

21 Claims, 2 Drawing Sheets

SOFT POLYMERIC COMPOUNDS INCLUDING HYDROPHOBIC FILLERS

FIELD OF THE INVENTION

The present invention relates to high damping polymer compositions with superior high-temperature stability, mechanical strength and moldability.

BACKGROUND

Free radical copolymerization of vinyl-substituted aromatic hydrocarbons and butadiene, vinyl-substituted aromatic hydrocarbons and maleic anhydride, $R^1R^2$ethylenes and maleic anhydride, and alkyl vinyl ethers and maleic anhydride are known. Further, imidization between a maleic anhydride and a mono-primary amine group is a commonly known chemical reaction.

Two or more polymers may be blended together to form a wide variety of random or structured morphologies to obtain products that potentially offer desirable combinations of characteristics. However, it may be difficult or even impossible in practice to achieve many potential combinations through simple blending because of some inherent and fundamental problems. Frequently, the two polymers are thermodynamically immiscible, which precludes generating a truly homogeneous product. While immiscibility may not be a problem since it may be desirable to have a two-phase structure, the situation at the interface between these two phases very often leads to problems. The typical case is one of high interfacial tension and poor adhesion between the two phases. This interfacial tension contributes, along with high viscosities, to the inherent difficulty of imparting the desired degree of dispersion to random mixtures and to their subsequent lack of stability, giving rise to gross separation or stratification during later processing or use. Poor adhesion leads, in part, to the very weak and brittle mechanical behavior often observed in dispersed blends and may render some highly structured morphologies impossible.

Adding a filler to a rubber matrix is a common practice for tire tread preparation. Most fillers function as mechanical enhancing agents, with applications for increasing strength and modulus of the polymer matrix to be filled. The characteristics which determine the properties a filler imparts to a rubber compound are particle size, surface area, structure, and surface activity. These principal characteristics of rubber fillers are interdependent in improving rubber properties. In considering fillers of adequately small particle size, reinforcement potential can be qualitatively considered as the product of surface area, surface activity, and persistent structure or anisometry.

The general influence of each of these three filler characteristics above on rubber properties can be summarized as follows: 1. Increasing surface area (decreasing particle size) gives lower resilience and higher Mooney viscosity, tensile strength, abrasion resistance, tear resistance, and hysteresis. 2. Increasing surface activity (including surface treatment) gives higher abrasion resistance, chemical adsorption or reaction, modulus, and hysteresis. 3. Increasing persistent structure/anisometry gives higher Mooney viscosity, modulus, and hysteresis, lower extrusion shrinkage, tear resistance, and resilience, and longer incorporation time.

In general terms, the effect of a filler on rubber physical properties can be related mainly to how many polymer chains are attached to the filler surface and how strongly they are attached. Filler surface area and activity are the main determinants, supplemented by structure.

Using a filler that has the correct combination of the above-mentioned properties to promote damping properties in a soft polymer composition is desirable. Currently, untreated precipitated silica has been increasingly used to replace carbon black as the filler for pneumatic tire treads with the attendent benefit of reduced rolling resistance. However, strong filler-filler interaction among silica particles makes the filler conglomerates hard to break down during mixing, and the resultant compound also shows a high hardness. Furthermore, poor filler-polymer interaction results in poor wear resistance for silica-filled tread in the absence of a proper coupling agent. Therefore silane coupling agents may be employed to improve both the processibility and wear resistance for silica-filled tread compounds.

To achieve an optimal material property improvement for a soft polymer gel composition, proper selection of filler is of key importance. Filler-filler interaction should not be so strong as to increase significantly the compound viscosity during mixing as well as the compound hardness of finished product, yet obvious reinforcement is desired. The filler and the polymer matrix should be compatible enough so that the filler can be incorporated and dispersed into the matrix easily and uniformly while minimally disturbing the structure desired in the original polymer composition. High tensile strength and increased damping properties at elevated temperatures properties are desired to give optimum function of the soft polymer gel composition. Importantly, and as suggested above, fillers work differently in various polymeric systems. In this regard, use of a filler in a polymer gel to provide high damping properties has proven especially difficult.

SUMMARY OF THE INVENTION

The present invention is a polymeric gel composition including a polymer having at least two different monomer units selected from a vinyl-substituted aromatic hydrocarbon, a $R^1R^2$ethylene, an alkyl vinyl ether, a maleimide, and a conjugated diene, a hydrophobically treated filler; and, optionally, an extender. If the polymer includes a maleimide, a maleated polyalkylene is included.

The present invention is directed to the use of copolymer gel filled with a hydrophobically treated, reinforcing filler to improve the tensile strength, tear strength, damping properties, and high-temperature compression set of these copolymers. The Shore A hardness of the present polymer gel compositions at room temperature is less than about 50, preferably less than about 20, and most preferably less than about 10.

Two broad classes of copolymers are used in this invention. The first is centipede polymers and the second is triblock copolymers. Centipede polymers are grafted polymer compositions of a maleated polyalkylene and a poly (alkenyl-co-maleimide). The alkenyl group in the centipede polymers can be a vinyl-substituted aromatic hydrocarbon, a $R^1R^2$ethylene, and/or an alkyl vinyl ether. The grafted centipede polymer is a thermoplastic, glass-like material that becomes a soft and rubber-like elastomer after being oil-extended.

The triblock copolymers contain at least two blocks of a vinyl-substituted aromatic hydrocarbon and at least one block of a hydrogenated conjugated diene. This triblock is then mixed with a non-aromatic oil to become a soft and rubber-like gel after being oil extended.

The following definitions apply hereinthroughout unless a contrary intention is expressly indicated:

"Vinyl aromatic hydrocarbon" and "alkenyl benzene" are used interchangeably;

"Maleic anhydride" encompasses dicarboxylic acids, including maleic anhydride, which can form a copolymer with an alkenyl benzene, an $R^1R^2$ethylene, or an alkyl vinyl ether, the copolymer having dicarboxylic acid units which are capable of reaction with an amine functional group;

"Maleimide" encompasses the reaction product of an amine and the dicarboxylic acids described above;

"$R^1R^2$ethylene" as used herein encompasses compounds of the general formula:

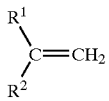

where $R^1$ and $R^2$ are the same or different substituents on the same or different carbon atoms of the ethylene group, and are independently H or substituted $C_1$–$C_{20}$ alkyl groups;

The general term "poly(alkenyl-co-maleimide)" includes poly(alkenylbenzene-co-maleimide), poly($R^1R^2$ethylene-co-maleimide), and poly(alkyl vinyl ether-co-maleimide); and "Centipede polymer" refers to the first class of polymers listed above, and "triblock polymer" refers to the second class of polymers listed above.

DETAILED DESCRIPTION OF THE INVENTION

Figure 1:
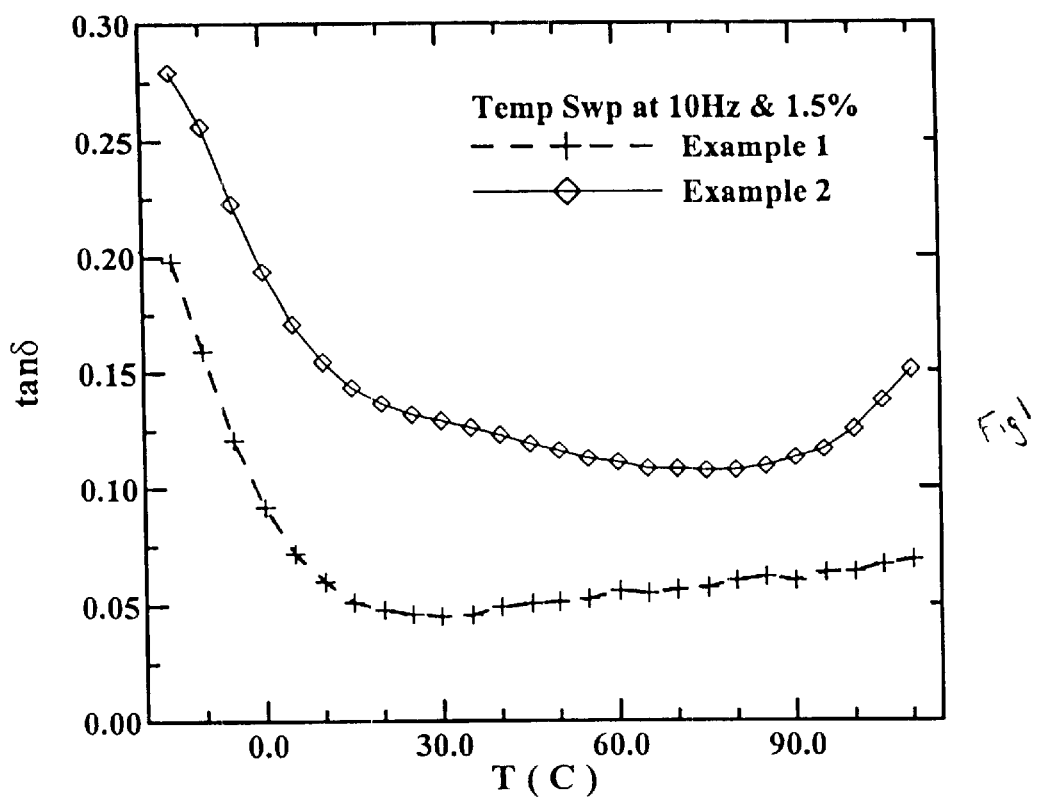
FIG. 1 is a graph depicting tan δ vs. temperature of the filled centipede polymer of example 2 and the unfilled centipede polymer of example 1.

The polymer gel composition utilizing centipede polymers contains: about 0.5-200 parts by weight (pbw) of a grafted polymer of a centipede having at least one maleated polyalkylene segment grafted thereto through at least one functional linkage formed by a cross-linking reaction with a grafting agent; optionally, about 0 to 100 pbw extender; and greater than about 0 to about 300 pbw of a hydrophobically treated filler.

The centipede polymer is formed by imidizing a poly (alkenyl-co-maleic anhydride) with a mono-primary amine. The centipede polymer has a high molecular weight spine connected with many relatively short side chains formed form the addition of the primary amines. The length of the main chain usually equals or is longer than the entanglement length, which is herein defined theoretically as an order of magnitude of 100 repeating units, while the length of the side chains is much smaller than the entanglement length.

Preferred alkenyl benzene contributed monomer units of the poly(alkenylbenzene-co-alkylmaleimide) centipede preferably are derived from one or more of styrene, α-methylstyrene, 1-vinyl-naphthalene, 2-vinyl-naphthalene, 1-α-methyl vinyl naphthalene, 2-α-methyl naphthalene, as well as alkyl, cycloalkyl, aryl, alkaryl, and aralkyl derivatives thereof, in which the total number of carbon atoms in the combined hydrocarbon is generally not greater than 12, as well as any di-or tri-vinyl aromatic hydrocarbons. Preferred vinyl aromatic hydrocarbons are either styrene or α-methyl styrene. The terms "alkenyl benzene" and "vinyl-substituted aromatic hydrocarbon" are understood to be interchangeable as used herein.

Preferred $R^1R^2$ethylene contributed monomer units of the poly($^1R^2$ethylene-co-alkylmaleimide) include any alkene such as ethylene, propylene, butylene, isobutylene, pentene, hexene, heptene, etc., as well as any di- or tri- alkene, or mixtures thereof, with preference given to isobutylene.

Preferred alkyl vinyl ether contributed monomer units of the poly(alkylvinyl ether-co-alkylmaleimide) include any alkylvinyl ether such as methylvinyl ether, ethylvinyl ether, propylvinyl ether, butylvinyl ether, and any other alkyl vinyl ether wherein the number of carbons in the alkyl substituent is not greater than about 12, and mixtures thereof. A preferred alkylvinyl ether is methylvinyl ether.

The poly(alkenyl-co-alkylmaleimides) described herein are subsequently graft-reacted through a difunctional linking or grafting agent to a maleated polyalkylene to yield a maleated polymer having at least one polyalkylene segment grafted thereto through at least one functional linkage thus formed. The alkylene moiety of the polyalkylene can be ethylene and/or propylene. A preferred polyalkeylene is polypropylene.

The maleated polypropylene may be any of the conventionally known polypropylene compounds that can be subsequently maleated by methods known in the art. The polypropylene grafted segment or segments have weight average molecular weights ($M_w$) of about 1000 to about 10,000,000 or higher, preferably about 20,000 to about 300,000.

The crystallinity of the polypropylene may vary from being substantially amorphous to being completely crystalline, that is from about 10–100% crystallinity. Most typically, because of the extensive commercial use of isotactic polypropylene, the grafted polypropylene will be substantially crystalline, e.g., having a crystallinity greater than about 90%. Generally, the polypropylene is substantially free of ethylene. However, under certain circumstances, small amounts of ethylene, on the order of less than about 10% by weight, may be incorporated. Furthermore, in certain instances, the polypropylene contains small amounts of ethylene in copolymers known as "reactor copolymers." Thus, the grafted polypropylenes can contain minor amounts of ethylene, both as part of the ethylene-propylene segments and as polyethylene segments.

The maleated polyalkylene contains from about 0.01 wt % incorporated maleic anhydride, based upon the weight of the maleated polyalkylene, up to about 5 wt %. Preferably, the maleic anhydride content will be from about 0.01 to about 2 wt %, most preferably about 0.03 to about 0.2 wt %. As will be apparent, unreacted polylakylene is present in the reaction mix as are minor amounts of reaction by-products, such as decomposed free-radical initiator compounds and low molecular weight free-radical products. These by-products are substantially removed by methods known in the art, e.g., sparging with $N_2$ or washing with water. Maleic anhydride may not be left in substantial amounts in the polymer without detrimental effects on the subsequent reaction of the poly(alkenyl-co-alkylmaleimide) with the maleated polyalkylene.

The poly(alkenyl-co-alkylmaleimide) is formed by reacting a poly(alkenyl-co-maleic anhydride) in the presence of a mono-primary amine or ammonia at temperatures from about 100° C. to about 300° C. and at a pressure from about slightly above vacuum to about 2026 kPa, under substantially dry conditions. The reactants are preferably dry mixed in the absence of solvents in a suitable mixing apparatus such as a Brabender mixer. Purging the mixer with nitrogen prior to charging of the reactants can be preferred. The primary amine or ammonia may be added in a single charge, or in sequential partial charges into the reactor containing a charge of poly(alkenyl-co-maleic anhydride). Preferably, the primary amine or ammonia is charged in ratio between 0.8 to 1.0 moles of nitrogen per monomer contributed units of maleic anhydride in the poly(alkenyl-co-maleic anhydride).

Suitable primary amines include, but are not limited to alkyl amines; alkyl benzyl amines; alkyl phenyl amines; alkoxybenzyl amines; allyl aminobenzoates; alkoxy aniline; and other linear primary amines containing from 1 to 50 carbon atoms, preferably 6 to 30 carbon atoms in the alkyl and alkoxy substituents in these primary amines. The alkyl and alkoxy substituents on the above-discussed primary amines can be linear or branched, preferably linear, and saturated or unsaturated, preferably saturated. Exemplary amines include hexylamine, octylamine, dodecylamine, and the like.

The poly(alkenyl-co-alkylmaleimide) prior to grafting with maleated polyalkylene, preferably has a $M_w$ between about 10,000 and 500,000, more typically between about 150,000 and 450,000.

The centipede polymer may be prepared by any means known in the art for combining such ingredients, such as blending, milling, or internal batch mixing. A rapid and convenient method of preparation involves heating a mixture of components to a temperature of about 50° to 290° C.

The centipede polymers of this invention are preferably manufactured by mixing and dynamically heat-treating the components described above, namely, by melt-mixing. As for the mixing equipment, any conventional, generally known equipment such as an open-type mixing roll, closed-type Banbury mixer, closed-type Brabender mixer, extruding machine, kneader, continuous mixer, etc., is acceptable. The closed-type Brabender mixer is preferred, as is mixing in an inactive gas environment such as $N_2$ or Ar.

Grafting of the maleated polyalkylene and the poly(alkenyl-co-alkylmaleimide) is performed by adding a grafting agent to the reaction mixture. Preferred grafting agents include low molecular weight organic compounds with at least 2 functional groups capable of crosslinking said polymer. Appropriate functional groups include primary amine, secondary amine, carboxyl, formyl, and hydroxyl. A preferred grafting agent is a polyamine, preferably an organic diamine. The grafting agent is added to a blend of maleated polyalkylene and poly(alkenyl-co-alkylmaleimide) to partially cross-link the polyalkylene to the poly(alkenyl-co-alkylmaleimide) through the maleate functional groups.

Suitable organic diamines or diamine mixtures containing two aliphatically or cycloaliphatically bound primary amino groups are used as grafting agents for the process according to the present invention. Such diamines include, for example, aliphatic or cycloaliphatic diamines corresponding to the formula $R^3(NH_2)_2$, wherein $R^3$ represents a $C_2$–$C_{20}$ aliphatic hydrocarbon group, a $C_4$–$C_{20}$ cycloaliphatic hydrocarbon group, a $C_6$–$C_{20}$ aromatic hydrocarbon group, or a $C_4$–$C_{20}$ N-heterocyclic ring, e.g., ethylenediamine; 1,2-and 1,3-propylene diamine; 1,4-diaminobutane; 2,2-dimethyl-1,3-diaminopropane; 1,6-diaminohexane; 2,5-dimethyl-2,5-diaminohexane; 1,6-diaminoundecane; 1,12- diaminododecane; I-methyl-4-(aminoisopropyl)-cyclohexylamine; 3-aminomethyl-3,5,5-trimethyl-cyclohexylamine; 1,2-bis-(aminomethyl)-cyclobutane; 1,2-diamino-3,6-dimethylbenzene; 1,2- and 1,4-diaminocyclohexane; 1,2-, 1,4-, 1,5-, and 1,8-diaminodecalin; 1-methyl-4-aminoisopropyl-cyclohexylamine; 4,4'-diamino-dicyclohexyl methane; 2,2'-(bis-4-amino-cyclohexyl)-propane; 3,3'-dimethyl-4,4'-diaminodicyclohexyl methane; 1,2-bis-(4-aminocyclohexyl)-ethane; 3,3', 5,5'-tetramethyl-bis-(4-aminocyclohexyl)-methane and -propane; 1,4-bis-(2-aminoethyl)-benzene; benzidine; 4,4'-thiodianiline; 3,3'-dimethoxybenzidine; 2,4-diaminotoluene; diaminoditolylsulfone; 2,6-diaminopyridine; 4-methoxy-6-methyl-m-phenylenediamine; diaminodiphenyl ether; 4,4'-bis(o-toluidine); o-phenylenediamine; methylene bis(o-chloroaniline); bis(3,4-diaminophenyl) sulfone; diaminophenylsulfone; 4-chloro-o-phenylenediamine; m-aminobenzyl amine; m-phenylene diamine; 4,4'-$C_1$–$C_6$-dianiline; 4,4'-methylene-dianiline; aniline-formaldehyde resin; trimethylene glycol-di-p-aminobenzoate; bis-(2-aminoethyl)-amine, bis-(3-aminopropyl) amine; bis-(4-aminobutyl)-amine; bis-(6-aminohexyl)-amine, and isomeric mixtures of dipropylene triamine and dibutylene triamine. Mixtures of these diamines may also be used.

Other suitable polyamines for use as grafting agents include bis-(aminoalkyl)-amines, preferably those having a total of from 4 to 12 carbon atoms such as bis-(2-aminoethyl) amine, bis-(3-aminopropyl) amine, bis-(4-aminobutyl) amine, and isomeric mixtures of dipropylene triamine and dibutylene triamine. Hexamethyl diamine, tetramethylene diamine, and especially 1,12-diaminododecane are preferred.

The second broad class of polymers applicable to this invention are the triblock copolymers containing at least two blocks A of a vinyl-substituted aromatic hydrocarbon and at least one block B of a hydrogenated conjugated diene. The triblock copolymer has the polymer structure of vinyl-substituted aromatic hydrocarbon/hydrogenated conjugated diene block copolymers represented by the formulae such as: $(AB)_nA$, $(BAB)_nA$, $(BAB)_nAB$, $(AB)_mX$, etc., wherein n is an integer of 1 or more, m is an integer of 2 or more, and X represents a coupling or polyfunctional initiator residue having two or more functional groups.

This triblock polymer contains 5 to 60 wt. % of a vinyl-substituted aromatic hydrocarbon and 40 to 95 wt. % of a hydrogenated conjugated diene. Both polymer blocks may take any of random, tapered and partial block arrangements and combinations thereof; and when the numbers of both said polymer blocks A and B are 2 or more, the structures of the respective polymer blocks may be the same or different.

Preferred vinyl-substituted aromatic hydrocarbon contributed monomer units of the triblock polymer are derived from styrene, α-methylstyrene, 1-vinyl naphthalene, 2-vinyl naphthalene, 1-α-methy vinyl naphthalene, 2-α-methyl vinyl naphthalene, as well as alkyl, cycloalkyl, aryl, alkaryl, and aralkyl derivatives thereof, in which the total number of carbon atoms in the combined hydrocarbon is generally not greater than 12, as well as any di- or tri-vinyl substituted aromatic hydrocarbons. Preferred vinyl-substituted aromatic hydrocarbons include styrene or α-methylstyrene.

Preferred conjugated diene contributed monomer units of the triblock polymer are derived from 1,3-butadiene, isoprene, 2,3-dimethyl-1,3-butadiene, 1,3-pentadiene, and mixtures thereof Particularly preferred conjugated dienes include 1,3-butadiene and/or isoprene. The block copolymer may be further hydrogenated to form a saturated polymer such as SEBS and SEPS.

Optionally, after the triblock polymer has been formed, it may be mixed with a polyphenylene ether resin. A preferred polyphenylene ether resin is poly(2,6-dimethyl-1,4-phenylene oxide), which is commercially available. The triblock polymer and the polyphenylene can be mixed in any conventional mixing apparatus known in the art, including an open-type mixing roll, closed-type Banbury mixer, closed-type Brabender mixer, extruding machine, kneader, continuous mixer, etc.

The closed-type Brabender mixer is preferable, and mixing in an inactive gas environment, such as nitrogen or argon, is also preferable.

The triblock copolymer of the above structure used in the present invention has a number average molecular weight ($M_n$) in a range of from about 100,000 to 1,000,000, preferably from 125,000 to 800,000, more preferably 150,000 to 500,000, and the molecular weight distribution ratio ($M_w/M_n$) is 10 or less. The molecular structure of the hydrogenated block copolymer may be any of straight chain, branched involving partial coupling with a coupling agent, radial, and the star-shaped types and combinations thereof.

There is no limitation for producing these triblock copolymers, so far as they have the structure described above. Polymerization methods such as free-radical polymerization and anionic polymerization are particularly preferred. These copolymers can be obtained by synthesizing a vinyl-substituted aromatic hydrocarbon/conjugated diene block copolymer in an inert solvent using an organolithium anionic initiator. The block copolymer may be further hydrogenated to form a saturated polymer such as SEBS and SEPS.

The polymer gels of the present invention may have an extender added to the polymer during final processing. Suitable extenders include extender oils and low molecular weight compounds or components, such as the extenders including, but not limited to: naphthenic, aromatic, paraffinic, phthalic, and silicone oils. A preferred extender for the present invention is a paraffinic oil. The final polymer compositions can contain between about 10 and 50%, preferably about 25 and 40%, oil and are thermoreversible elastomers.

A hydrophobically treated filler is added to the polymer compositions of the present invention. By adding a hydrophobically treated filler, the polymer compositions demonstrate significantly enhanced damping properties, as well as increased tensile strength while maintaining the softness of the compounds. The fillers used in this invention are pretreated, with the surface hydrophilic groups having been partially or fully converted to a variety of hydrophobic groups. These fillers can be pre-mixed with either powder or polymer oil.

Fillers contemplated for use in the present invention are hydrophobic. Appropriate fillers include one or more of oxidic or siliceous fillers such as, but not limited to, fumed silica, colloidal silica, precipitated silica, clay, titanium oxide, zeolite, and alumina. The fillers are exposed to hydrophobic treatment to convert hydrophilic surfaces to hydrophobic. Typical hydrophobic surface treatments include vapor phase modification at the saturation pressure of the modifier vapor, liquid-phase modification, and vapor-phase modification at a high pressure of a modifier.

Hydrophobic siliceous fillers are preferred. These may be hydrophobically treated by reaction with silicon compounds which are reactive to the surface silanol groups on the filler. Suitable silicon compounds include hexamethyl disilazane, tetramethoxysilane, tetraethoxysilane, octyltrimethoxysilane, octyltriethoxysilane, octadecyltriethoxysilane, dimethyldiethoxysilane, trimethylethoxysilane, polydimethylsiloxanes with reactive silanol groups and with reactive alkoxysilyl ether groups such as, for example, methoxy and ethoxy radicals, cyclic dimethylsiloxane ethers such as octamethylcyclotetrasiloxane, or sulphur-containing silyl esters, in particular bis-(tialkoxysilyl-alkyl)-polysulphides, and mixtures thereof.

The reaction temperatures are between room temperature and the decomposition temperature of the silicon compound. The reaction may optionally be accelerated by acidic or alkaline catalysts. Examples of these are ammonia and sodium alcoholate.

The hydrophobic fillers have no water wettablity at room temperature, and have methanol wettabilities of 1 to 60%, preferably 5 to 50%. The methanol wettability represents the proportion by weight of methanol in a methanol/water mixture which is just sufficient to wet the filler.

Particularly preferred fillers include highly dispersed silicas, synthetic silicates, natural silicates, glass fibers and glass fiber products, or glass microbeads, metal oxides, metal carbonates, metal hydroxides, and mixtures thereof.

The fillers are preferably added to the polymer compositions in the range of 0.5–300 pbw rubber. The preferred range is between about 0.5–150 pbw rubber.

An example of a suitable filler in the present invention is Aerosil™ R8200, a hydrophobically treated fumed silica, from Degussa-Huls Corp. The hydrophilic surface silanol groups of Aerosil™ 200 are converted to hydrophobic trimethyl silyl groups through treatment with hexamethyl disilazane (HMDS). The average primary particle size is about 12 nm.

In addition, stabilizers, antioxidants, reinforcing agents, reinforcing resins, pigments, and fragrances are examples of additives which can also be utilized in the present invention.

The compositions of the present invention are favorably used in the manufacturing of any product in which the following properties are advantageous: a degree of softness, heat resistance, decent mechanical properties, elasticity, good adhesion, and/or high damping. The compositions of the present invention can be used in many industry fields, in particular, in the fabrication of automotive parts, tire tread formulations, household electrical appliances, industrial machinery, precision instruments, transport machinery, constructions, engineering, medical instruments, and non-tread tire rubber formulations.

Representative examples of uses of the composition of the present invention are in the fabrication of damping materials and vibration restraining materials. These uses involve connecting materials such as sealing materials, packing, gaskets, and grommets; supporting materials such as mounts, holders, and insulators; and cushion materials such as stoppers, cushions, and bumpers. These materials are also used in equipment producing vibration or noise and household electrical appliances, such as in air-conditioners, laundry machines, refrigerators, electric fans, vacuums, dryers, printers, and ventilator fans. These materials are also suitable as impact absorbers in audio equipment and electronic or electrical equipment, sporting goods, and shoes.

In the following, the present invention is described in more detail with reference to non-limiting examples. The following examples and table are presented for purposes of illustration only, and are not to be construed in a limiting sense.

EXAMPLE 1 (Comparative)

15 g of SEPTON™ 4077 triblock SEPS polymer in powder form (from Kurary Company) was put into an aluminum pan. 35.0 g of a paraffinic oil were then poured into the pan, and a lab spoon was used to mix the two components together. The mixture was left overnight to allow for oil absorption and polymer swelling.

EXAMPLE 2

15 g of SEPTON™ 4077 triblock SEPS polymer in powder form was put into an aluminum pan. Ten grams of Aerosil™ R8200 fumed silica (Aerosil™ 200 treated with 1,1,1-trimethyl-N-(trimethylsilyl) silanamine) were added to the aluminum pan. On this silica, the surface hydroxyl groups had been converted to trimethylsiloxy groups. 35.0 g of a paraffinic oil were then poured into the pan, and a lab spoon was used to mix the three components together. The mixture was then left overnight to allow for oil absorption and polymer swelling.

The mixed ingredients were then poured into a 65 g Brabender mixer which had already been heated to ~180° C. under constant $N_2$ purging. At a rate of ~60 rpm the compound was mixed for 10 minutes before being discharged into an aluminum pan.

Figure 2:
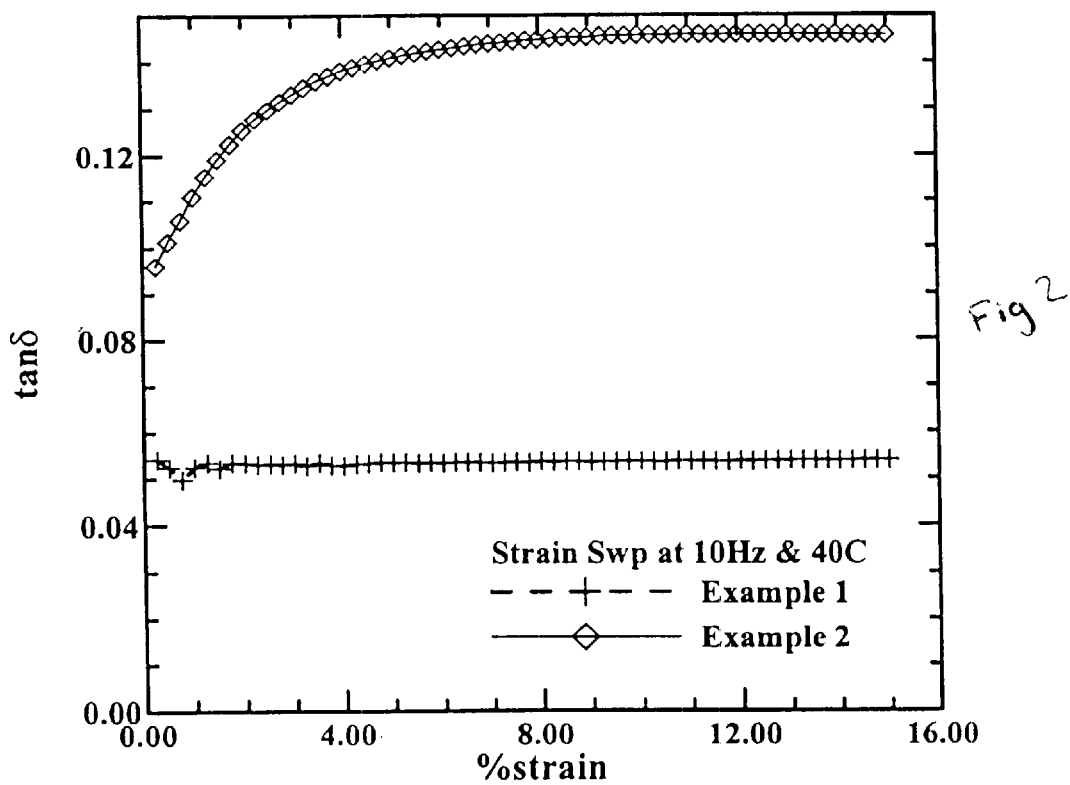
FIG. 2 is a graph depicting tan δ vs. strain at 10 Hz and 40° C. of the filled polymer of example 2 and the unfilled centipede polymer of example 1.

The products were molded into a bar and a slab at 165° C. for measurements of Shore A hardness, compression set, ring tensile properties, and dynamic shear viscoelastic properties. The Shore A hardness, modulus measurements, and stress and strain were all measured at room temperature. The hysteresis values were measured at 10 Hz and 1.5% strain over a temperature sweep. The detailed physical properties of the new gel compositions, in comparison with those of the unfilled compound, are shown in Table 1 and FIGS. 1 and 2.

TABLE 1

| Example | 1 (comparative) | 2 |
|---|---|---|
| Shore A | 5.5 | 10 |
| Ring tensile test at room temperature | | |
| 5% Modulus (kPa) | 10.47 | 18.2 |
| 15% Modulus (kPa) | 12.75 | 29.85 |
| 25% Modulus (kPa) | 19.09 | 40.6 |
| 35% Modulus (kPa) | 28.47 | 54.59 |
| Maximum Stress (kPa) | 1541.9 | 2901.9 |
| Maximum % strain | 1146 | 949.8 |
| Temperature Sweep at 10 Hz and 1.5% strain | | |
| tan δ 20° C. | 0.0479 | 0.136 |
| tan δ 40° C. | 0.0492 | 0.123 |
| tan δ 60° C. | 0.0558 | 0.111 |

EXAMPLE 3

To a 6L kneader-extruder (MXE-6, Jaygo, Inc.) equipped with sigma blades was added 1252 g of Isoban™—10 poly(maleic anhydride-alt-isobutylene) (Kurary Co.) and 988 g octylamine (99%, BASF) at 54° C. The mixing was started with a blade speed of 25 rpm and the screw speed of 40 rpm for 5 minutes, then the temperature of the mixer was programmed to rise to 190° C. at a rate of about 3° C./minute. The mixing was further continued for 2 more hours isothermally at 190° C. Then, 562 g of PO1015 maleated polypropylene (Exxon) was added to the mixer. Mixing was continued for another 30 minutes. 23 g of dodecane diamine (98%, Aldrich) was added. After 15 minutes, 4303 g DTDP oil [di(tridecyl)phthalate] (CP Hall Co.) was added to the mixer and the temperature of the mixer was adjusted to 160° C. After another 2 hours, the final product was extruded through a ¼ inch (~63 cm) die. The final product contained 33% DTDP oil and was a thermoplastic elastomer. Preparation of High Damping Gels

EXAMPLE 4 (Comparative)

A charge of 25 g of the product from example 3 was added to a Brabender mixer (~55 g capacity) equipped with a roller blade and $N_2$ purging. The mixer was initially set to 160° C. and 60 rpm. After 2 minutes, a charge of 25 g DTDP oil was added to the mixer. The material was further mixed at those conditions for 8 minutes. Agitation was stopped and the mixture was removed from the mixer.

EXAMPLE 5 (Comparative)

A charge of 20 g of the product from example 3 was added to a Brabender mixer (~55 g capacity) equipped with a roller blade and $N_2$ purging. The mixer was initially set to 160° C. and 60 rpm. After 2 minutes, a charge of 10 g Aerosil 200 untreated fumed silica (Degussa) and 20 g DTDP oil were added to the mixer. The material was further mixed at those conditions for approximately 15 minutes. Agitation was stopped and the mixture was removed for the mixer.

EXAMPLE 6

A charge of 20 g of the product of example 3 was added to a Brabender mixer ~55 g capacity) equipped with a roller blade and $N_2$ purging. The mixer was initially set to 160° C. and 60 rpm. After 2 minutes, a charge of 10 g of Aerosil R8200 treated fumed silica (Degussa) and 20 g of DTDP oil was added to the mixer. (The filler and oil could be added sequentially or as a mixture.) The material was further mixed at those conditions for approximately 15 minutes. Agitation was stopped and the mixture was removed from the mixer.

Figure 3:
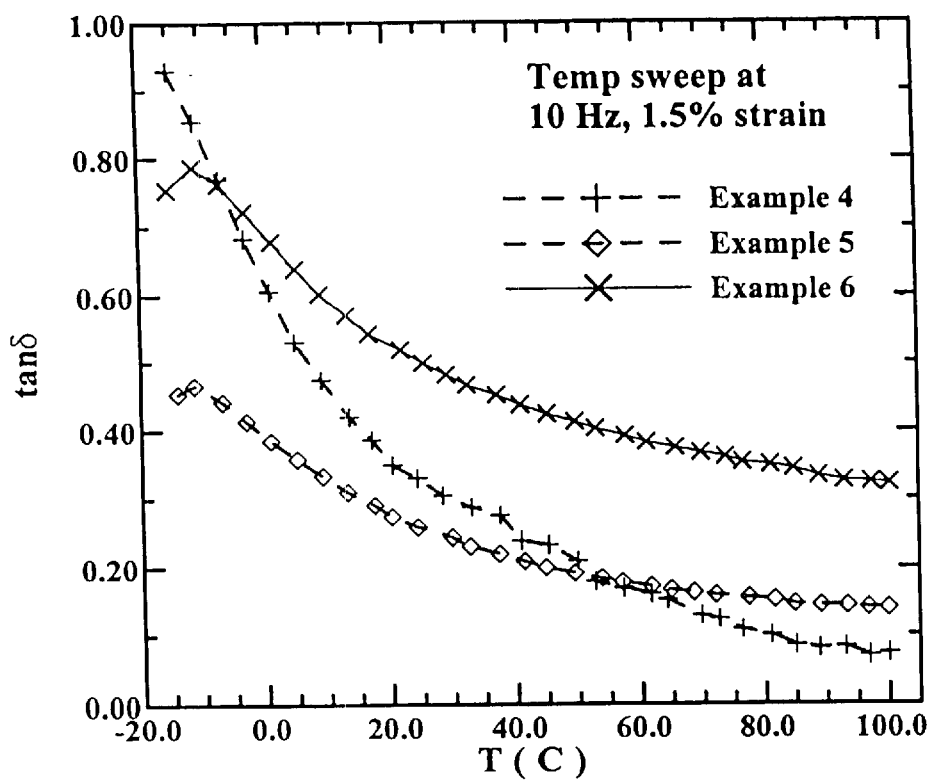
FIG. 3 is a graph depicting tan δ vs. temperature at 10 Hz and 1.5% strain of examples 4 (unfilled) and example 5 and 6 (filled).
Figure 4:
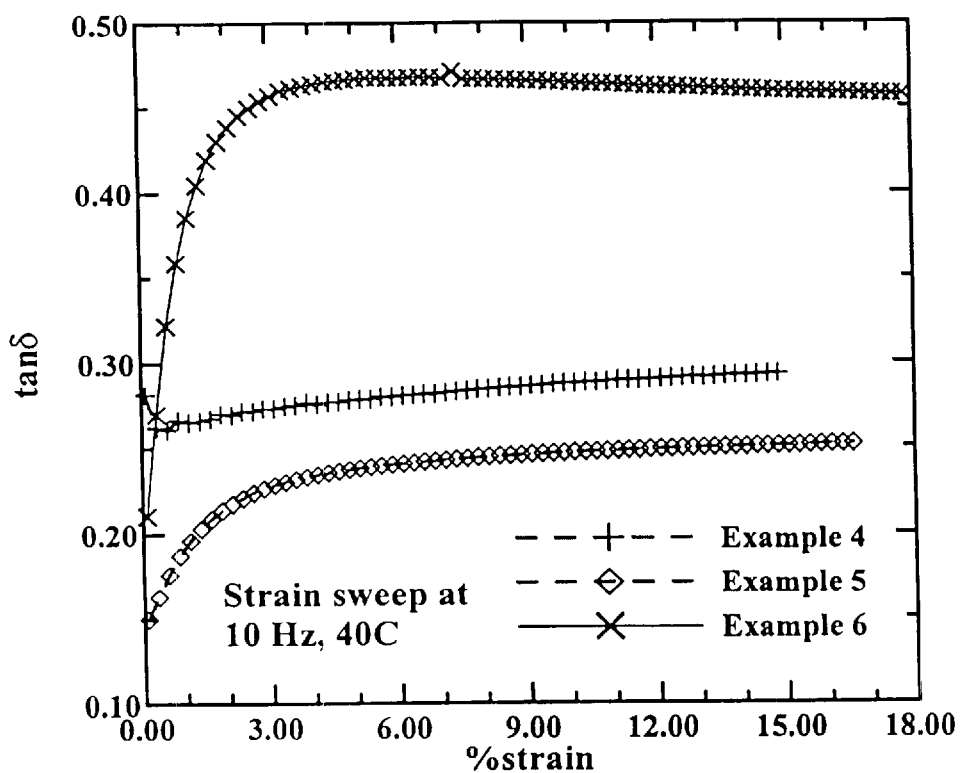
FIG. 4 is a graph depicting tan δ vs. %strain at 10 Hz and 40° C. of examples 4 (unfilled) and example 5 and 6 (filled).

The products from examples 4–6 were molded into a bar and a slab at ~160° C. for measurements of Shore A hardness, compression set, ring tensile properties, and dynamic shear viscoelastic properties. The detailed physical properties of the new product, in comparison with the controls, are given in Table 2 and FIGS. 3 and 4.

As can be seen by the table and figures, hysteresis values of the polymer filled with a treated silica are improved over the hysteresis values of the unfilled polymer and the polymer filled with an untreated silica. Overall damping qualities have been improved, and the product has maintained tensile strength.

TABLE 2

| Example | 4 (comparative) | 5 (comparative) | 6 |
|---|---|---|---|
| Shore A hardness ~20° C. | 3 | 40 | 7 |
| Ring Tensile test at room temp. | | | |
| 5% modulus (kPa) | 5.38 | 68.8 | 7.79 |
| 15% modulus (kPa) | 6.41 | 94.4 | 10.82 |
| 25% modulus (kPa) | 9.51 | 146.1 | 17.8 |
| 35% modulus (kPa) | 13.58 | 208.9 | 26.3 |
| Maximum stress (kPa) | 232.4 | 273.6 | 210.2 |
| Maximum % strain | 224 | 32.7 | 170 |
| Temperature Sweep at 10 Hz and 1.5% strain | | | |
| tan δ at 20° C. | 0.348 | 0.274 | 0.519 |
| tan δ at 40° C. | 0.238 | 0.209 | 0.437 |
| tan δ at 60° C. | 0.160 | 0.171 | 0.381 |

TABLE 2-continued

| Example | 4 (comparative) | 5 (comparative) | 6 |
|---|---|---|---|
| Strain Sweep at 10 Hz and 40° C. | | | |
| tan δ at 0.60% | 0.260 | 0.176 | 0.322 |
| tan δ at 3.1% | 0.273 | 0.228 | 0.457 |
| tan δ at 14.8% | 0.293 | 0.251 | 0.460 |

Although the invention has been described with reference to exemplary embodiments, various changes and modifications can be made without departing from the scope and spirit of the invention as defined in the appended claims.

We claim:

1. A polymer gel composition having a Shore A hardness less than 20 comprising:
    a. a copolymer having at least 1 block select from a vinyl-substituted aromatic hydrocarbon, a $R^1R^2$ethylene, an alkyl vinyl ether, and at least one additional block containing maleimide contributed monomer units,
    b. optionally, an extender,
    c. at least one oxidic or siliceous filler having surface hydroxyl groups replaced by alkyl or alkoxy groups,
    d. a maleated polyalkylene, and
    e. a grafting agent.

2. The polymer composition of claim 1 wherein said copolymer comprises poly(alkenyl benzene-co-maleimide).

3. The polymer composition of claim 1 wherein said copolymer comprises poly($R^1R^2$ethylene-co-maleimide).

4. The polymer composition of claim 1 wherein said copolymer comprises poly(alkyl vinyl ether-co-maleimide).

5. The composition of claim 1 wherein said vinyl-substituted aromatic hydrocarbon is chosen from any one or combination of styrene, α-methylstyrene, 1-vinylnaphthalene, 2-vinyl-naphthalene, 1-α-methylvinylnaphthalene, 2-α-methylvinyinaphthalene, as well as alkyl, cycloalkyl, aryl, alkaryl, and aralkyl derivatives thereof, in which the total number of carbon atoms in the combined hydrocarbon is generally not greater than 12, as well as any di- or tri-vinyl-substituted aromatic hydrocarbons.

6. The composition of claim 5 wherein said vinyl-substituted aromatic hydrocarbon is styrene.

7. The composition of claim 1 wherein said $R^1R^2$ ethylene is one or more of ethylene, propylene, butylene, isobutylene, pentene, hexene, and heptene.

8. The composition of claim 1 wherein said $R^1R^2$ethylene is isobutylene.

9. The composition of claim 1 wherein said alkyl vinyl ether is one or more of methyl vinyl ether, ethyl vinyl ether, propyl vinyl ether, butyl vinyl ether, pentyl vinyl ether, hexyl vinyl ether, and an alkyl vinyl ether with up to 12 carbon atoms in the alkyl substituent.

10. The composition of claim 9 wherein said alkyl vinyl ether is methyl vinyl ether.

11. The composition of claim 1 wherein said maleimide is the reaction product of maleic anhydride and a mono-primary amine.

12. The composition of claim 11 wherein said mono-primary amine is octyl amine.

13. The composition of claim 1 wherein said extender comprises at least about 10% of the composition.

14. The composition of claim 13 wherein said extender is a paraffinic oil.

15. The composition of claim 1 wherein the monomer from which the alkylene moiety of said maleated polyalkylerie is derived from at least one of ethylene, and propylene.

16. The composition of claim 1 wherein said grafting agent comprises at least one of primary amines, secondary amines, carboxyl, formyl, and hydroxyl.

17. The composition of claim 1 wherein said grafting agent is a diamine.

18. The composition of claim 1 wherein said contributed monomer units are derived from at least one of 1,3-butadiene, and isoprene.

19. The composition of claim 1 wherein said oxidic or siliceous filler comprises at least one of hydrophobically treated fumed silica, hydrophobically treated colloidal silica, hydrophobically treated precipitated silica, hydrophobically treated clay, hydrophobically treated titanium oxide, hydrophobically treated zeolites, and hydrophobically treated alumina.

20. The composition of claim 1 wherein said oxidic or siliceous filler has a methanol wettability between about 1 and 60%.

21. The composition of claim 1 wherein said oxidic or siliceous filler is a fumed silica treated with a silicon compound to convert surface silanol groups to hydrophobic surface groups.

* * * * *

UNITED STATES PATENT AND TRADEMARK OFFICE
CERTIFICATE OF CORRECTION

PATENT NO. : 6,458,881 B1
DATED : October 1, 2002
INVENTOR(S) : Xiao-Dong and Xiaorong Wang It is certified that error appears in the above-identified patent and that said Letters Patent is hereby corrected as shown below:

Column 12,
Line 22, "of said maleanated polyalkylerie" should read -- of said maleanated polyalkene --.

Signed and Sealed this

Sixteenth Day of March, 2004

JON W. DUDAS
*Acting Director of the United States Patent and Trademark Office*